US006900914B1

(12) United States Patent
Tanaka et al.

(10) Patent No.: US 6,900,914 B1
(45) Date of Patent: May 31, 2005

(54) OPTICAL INFORMATION RECORDING AND REPRODUCING APPARATUS HAVING VOLUME HOLOGRAPHIC MEMORY

(75) Inventors: Satoru Tanaka, Tsurugashima (JP); Tomomitsu Kouno, Tsurugashima (JP); Hideki Hatano, Tsurugashima (JP); Yoshihisa Itoh, Tsurugashima (JP); Hajime Matsushita, Tsurugashima (JP); Takashi Yamaji, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/538,149

(22) Filed: Mar. 29, 2000

(30) Foreign Application Priority Data

Mar. 30, 1999 (JP) ............................................ 11-088413

(51) Int. Cl.$^7$ .............................. G03H 1/04; G03H 1/02
(52) U.S. Cl. ................................ 359/35; 359/7; 359/10; 359/11; 359/22
(58) Field of Search ............................ 359/3, 7, 10, 11, 359/22, 35, 15, 8, 21; 369/102, 103

(56) References Cited

U.S. PATENT DOCUMENTS

| 3,737,878 | A | * | 6/1973 | Gamblin et al. | ................ | 359/8 |
| 5,483,365 | A | * | 1/1996 | Pu et al. | ........................ | 359/11 |
| 5,648,856 | A | * | 7/1997 | Stoll | .............................. | 359/3 |
| 5,665,493 | A | * | 9/1997 | Bai et al. | ........................ | 359/7 |
| 5,844,700 | A | * | 12/1998 | Jeganathan et al. | ............. | 359/7 |
| 6,101,161 | A | * | 8/2000 | Yang | ............................ | 369/103 |
| 6,320,683 | B1 | * | 11/2001 | Ito et al. | ........................ | 359/22 |

FOREIGN PATENT DOCUMENTS

| JP | 5-142979 | 6/1973 |
| JP | 10-97174 | 4/1998 |

* cited by examiner

*Primary Examiner*—Audrey Chang
(74) *Attorney, Agent, or Firm*—Finnegan, Henderson, Farabow, Garrett & Dunner, L.L.P.

(57) ABSTRACT

A description is provided of an optical information recording and reproducing apparatus having a volume holographic memory. The apparatus is capable of recording an interference pattern in the volume holographic memory in high density and can be made small-sized. The apparatus includes a comprises support portion for detachably supporting the volume holographic memory, which is made of a photorefractive crystalline material; a reference beam supplying portion for making a coherent reference beam of a first wavelength incident on the volume holographic memory; a signal beam generating portion for making a coherent signal beam of the first wavelength, which is modulated in accordance with image data, incident on the volume holographic memory, intersecting therein the signal beam with the reference beam, and generating a three-dimensional light interference pattern of the signal beam and the reference beam; and detecting a portion for detecting diffracted light from a refractive index grid of the light interference pattern in the volume holographic memory, due to irradiation of the reference beam. The signal beam and the reference beam are arranged in a plane having a normal line perpendicular to the symmetrical axis of rotation of the volume holographic memory.

12 Claims, 4 Drawing Sheets

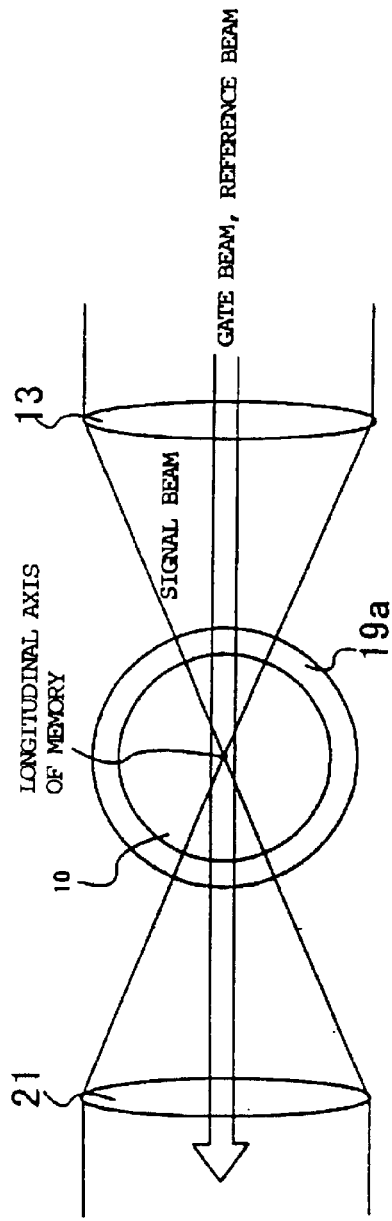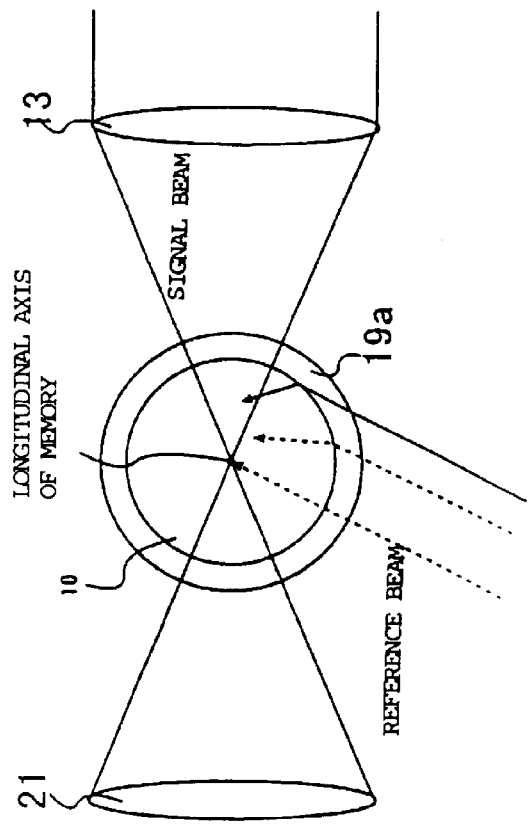
FIG. 4
FIG. 5

OPTICAL INFORMATION RECORDING AND REPRODUCING APPARATUS HAVING VOLUME HOLOGRAPHIC MEMORY

BACKGROUND OF THE INVENTION

1. Field of the Invention

The present invention relates to a volume holographic memory and an optical information recording and reproducing apparatus using the volume holographic memory.

2. Description of the Related Art

Conventionally, a holographic memory system is known as a digital recording system using the principle of holography. The holographic memory system records and reproduces digital data to/from a memory medium of a photorefractive crystalline such as lithium niobate ($LiNbO_3$). The photorefractive effect is a phenomenon in which electric charges generated by photoexcitation move in crystals to thereby form a spatial electric field distribution, which combines with a primary electro-optical effect (i.e., Pockels effect) to change a refractive index of the crystals.

With regard to a ferro-electric crystal which exhibits the photorefractive effect, a refractive index change normally responds to an optical input pattern of 1000 or more lines per 1 mm, and the effect generates in real-time at a response speed on the order of micro-second to second, depending upon a material used. Therefore, such crystal has been studied as a real time hologram medium, which does not need developing, with respect to various applications.

The holographic memory system can record and reproduce data in a two-dimensional plane page unit, and perform multiple recording with the use of a plurality of pages. The volume holographic memory enables three-dimensional recording with the memory medium being of three-dimensional configuration such as a rectangular parallelepiped. The volume holographic memory is a kind of Fourier transform holograms. Data is recorded in a dispersed manner by unitary image pages in a three-dimensional space of the memory. An overview of the holographic memory system will be described hereinbelow with reference to FIG. 1.

In FIG. 1, an encoder 25 converts digital data to be recorded in a volume holographic memory 1, into a dot pattern image of light and darkness in a plane, and rearranges the image in a data arrangement of, for example, 480 bits in a line and 640 bits in a row to generate a unitary-page sequence data. The unitary-page sequence data is supplied to an SLM (Spatial Light Modulator) 12 such as a panel of a transmission type Thin Film Transistor Liquid Crystal Display (hereinafter, referred to as "TFT-LCD" or "LCD").

The SLM 12 performs a modulation processing by the processing unit of 480 pixels in line and 640 pixels in row, which corresponds to a unitary page. More particularly, the SLM 12 performs light modulation of a light beam or a source beam into an on/off signal of spatial light, corresponding to the unitary-page sequence data from the encoder 25. The modulated source beam or a signal light beam (hereinafter, referred to simply as "signal beam") is conducted to a lens 13. More specifically, the SLM 12 passes therethrough the source beam in response to the Boolean value "1" of the unitary-page sequence data, which is an electric signal, and shuts off the source beam in response to the Boolean value "0" to thereby achieve electro-optical conversion in accordance with the contents of respective bits in the unitary page data. Accordingly, the signal beam of the unitary page sequence is generated by modulation of the source beam.

The signal beam is incident upon the volume holographic memory 1 through the lens 13. In addition to the signal beam, a reference light beam (hereinafter, referred to simply as "reference beam") is incident upon the volume holographic memory 1 at an angle β (hereinafter, referred to as "incident angle β") relative to a predetermined reference line perpendicular to an optical axis of the signal beam.

The signal beam and the reference beam interfere with each other within the volume holographic memory 1, and the resulting interference fringe is stored as a refractive index grid within the volume holographic memory 1, whereby recording of data is effected. Also, recording of three-dimensional data is made possible by angular-multiplexed recording of a plurality of two-dimensional plane data with variance of the incident angle β.

When reproducing the recorded data from the volume holographic memory 1, only the reference beam is made incident upon the volume holographic memory 1 at the same incident angle β as at the time of recording toward the center of a region where the signal beam and the reference beam intersect with each other. That is, reproducing the recorded data is different from recording data, in that the signal beam is not made to be incident. Therefore, diffracted light from the interference fringe recorded in the volume holographic memory 1 is conducted to a CCD (Charge Coupled Device) 22 in a light detector through a lens 21. The CCD 22 converts light and dark patterns of the incident beam into variations in intensity of an electric signal to output to a decoder 26 an analog electric signal having a level corresponding to brightness of the incident beam. The decoder 26 compares the analog signal with a predetermined amplitude (i.e., slice level) to reproduce data consisting of the corresponding "1" and "0".

Because recording is performed in a two-dimensional plane data sequence within the volume holographic memory as described above, the incident angle β of the reference beam is varied to enable the angular multiplexed recording. That is, the incident angle β of the reference beam is varied to enable of defining a plurality of two-dimensional planes wherein the plane is a unit of recording, within the volume holographic memory. Therefore, three-dimensional recording can be achieved. An example of angular multiplexed recording is described in Japanese Unexamined Patent Publication Kokai Nos. 45-142979 and H10-97174.

OBJECT AND SUMMARY OF THE INVENTION

It is an object of the present invention to provide an optical information recording and reproducing apparatus having a volume holographic memory, which apparatus is capable of recording an interference pattern in the volume holographic memory in high density and can be made small-sized.

According to the present invention, there is provided an optical information recording and reproducing apparatus having a volume holographic memory made of a photorefractive crystalline material, the apparatus comprises: a support portion for detachably supporting the volume holographic memory; a reference beam supplying portion for supplying a coherent reference beam of a first wavelength incident on the volume holographic memory; a signal beam generating portion for supplying a coherent signal beam of the first wavelength, which is modulated in accordance with image data, incident on the volume holographic memory, intersecting therein the signal beam with the reference beam, and generating a three-dimensional light interference pattern of the signal beam and the reference beam; and a detecting portion for detecting a diffracted light from a refractive index grid of the light interference pattern in the volume holographic memory, due to irradiation of the reference beam; wherein the signal beam and the reference beam are arranged in a plane having a normal line perpendicular to the symmetrical axis of rotation of the volume holographic memory.

An optical information recording and reproducing apparatus according to the present invention further comprises a gate beam supplying portion for supplying a gate beam incident on the volume holographic memory, wherein the gate beam is of a second wavelength for increasing photosensitivity of the volume holographic memory and for one of activating or deactivating the refractive index grid depending upon the existence or non-existence of the light interference pattern.

According to one aspect of the present invention, the gate beam is arranged in a plane having a normal line perpendicular to the symmetrical axis of rotation of the volume holographic memory.

According to still another aspect of the present invention, the gate beam supplying portion includes a superluminescent diode.

According to further aspect of the present invention, the gate beam supplying portion includes means for restrictedly irradiating the gate beam onto a region where the reference beam and the signal beam intersect each other.

According to still another aspect of the present invention, the support portion includes means for moving the volume holographic memory in a direction along the symmetrical axis of rotation.

According to still another aspect of the present invention, the support portion includes means for rotating the volume holographic memory about the symmetrical axis of rotation.

BRIEF DESCRIPTION OF THE DRAWINGS

FIG. 4 is a plan view showing an essential part of a cylindrical volume holographic memory of the volume holographic memory system viewed from the top surface thereof according to the present invention, and FIG. 5 is a perspective view showing an essential part for a comparative example of a volume holographic memory system.

DETAILED DESCRIPTION OF THE PREFERRED EMBODIMENTS

Embodiments of the present invention will now be described with reference to the drawings.

Figure 1:
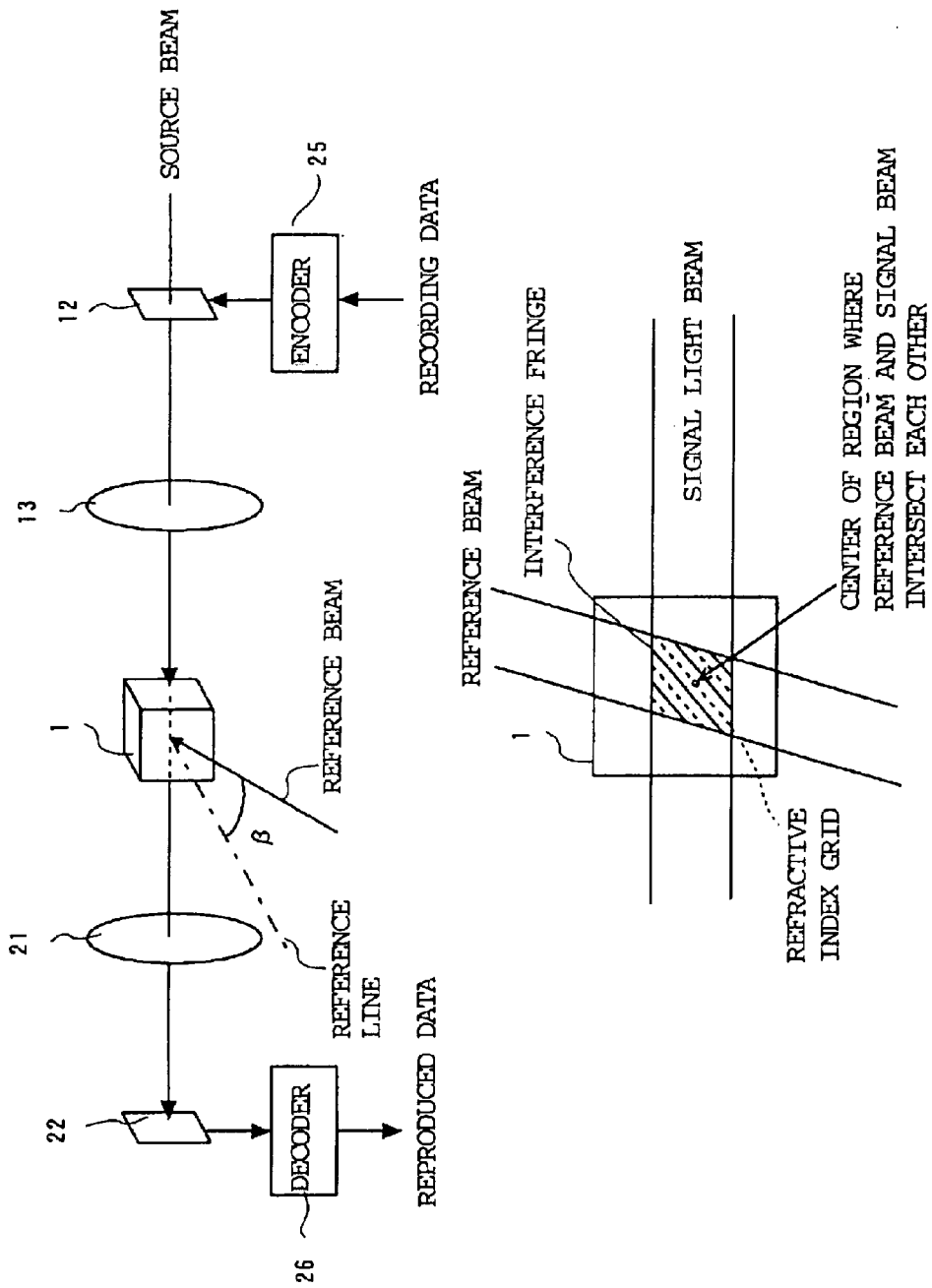
FIG. 1 is a diagram showing a configuration of a conventional volume holographic memory system.
Figure 2:
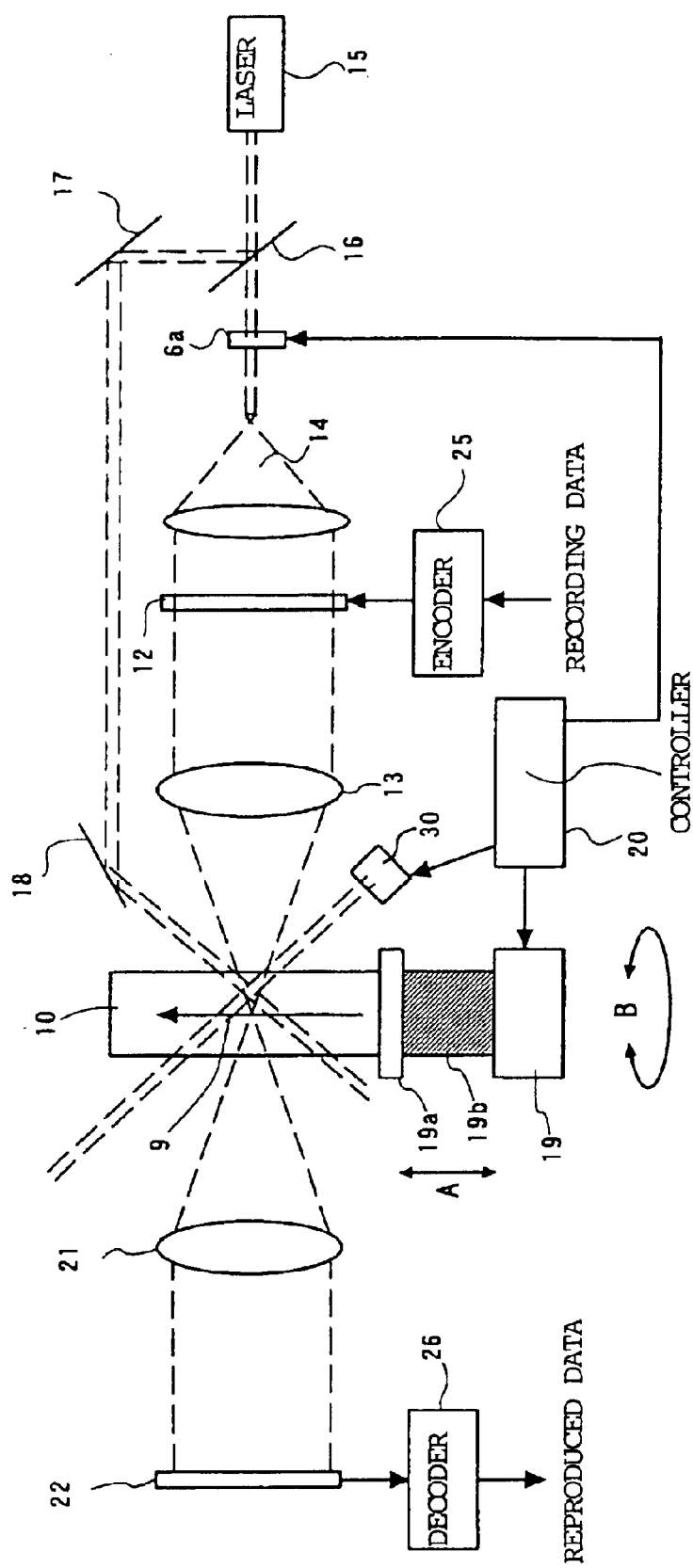
FIG. 2 is a side view showing a configuration of a volume holographic memory system according to the present invention.

FIG. 2 shows an example of an optical information recording and reproducing apparatus using a volume holographic memory according to the present invention.

At the time of recording, a beam splitter 16 divides a light beam or a source beam emitted from a laser 15 into two beams, that is, a signal light beam which goes straight ahead, and a reference light beam which is deflected. The resultant light beams are conducted to optical paths for a signal beam optical system and a reference beam optical system, respectively.

A source beam having passed through the beam splitter 16 is incident on a volume holographic memory 10 through a shutter 6a, a light beam expander 14, a spatial optical modulator 12 and a Fourier transform lens 13. An automatic shutter is controlled by a controller to limit a period of time, during which the source beam irradiates the volume holographic memory, and the light beam expander 14 enlarges the source beam into a parallel light beam having a predetermined diameter. The spatial optical modulator 12 is, for example, a two-dimensional plane LCD containing 640 pixels in a line and 480 pixels in a row, and converts the beam from the light beam expander 14 into a signal beam in accordance with digital recording data supplied from an encoder 25. After the spatial optical modulator 12 performs spatial modulation on the beam with a two-dimensional grid pattern (for example, a checkered pattern) or transmission/non-transmission for every pixel in accordance with the digital recording data, the beam is subjected to Fourier transformation by the Fourier transform lens 13. The transformed beam is condensed on the volume holographic memory 10, and is formed in the volume holographic memory 10 to provide a Fourier transform image. The volume holographic memory 10 having a cylindrical form is arranged so that a Fourier plane provided by the lens 13 is parallel to a symmetrical axis of rotation of the volume holographic memory 10. The volume holographic memory 10 made of a photorefractive crystalline has a cylindrical body made of a uniaxial crystal, such as $LiNbO_3$, and an axis of the optical crystal is parallel to its rotational symmetry axis.

The reference beam is reflected by mirrors 17, 18 in the reference beam system to be incident upon the volume holographic memory 10, and is made to intersect and interfere with the signal beam from the lens 13 in a position within the medium to form a three-dimensional interference fringe. At this time, optical elements such as the mirror 18, the lens 13 and the like are arranged so that the reference beam and the signal beam interfere with each other not on the Fourier plane but in front of or inward of the Fourier plane. The reference beam and the signal beam are arranged in a flat plane, which contains a normal line perpendicular to the symmetrical axis of rotation of the volume holographic memory.

A superluminescent diode 30 adapted for generation of a gate beam is provided below a side of the volume holographic memory 10 so as to project the gate beam onto the side of the volume holographic memory 10. The gate beam includes a light beam of a second wavelength adapted to increase photosensitivity of the volume holographic memory 10. The second wavelength is different from those of the reference beam and the signal beam. The gate beam activates or deactivates a refractive index grid depending upon existence or non-existence of a light interference pattern in the volume holographic memory 10. Accordingly, the gate beam serves as an erasure light beam on the refractive index grid, which is produced by the light interference pattern.

Figure 3:
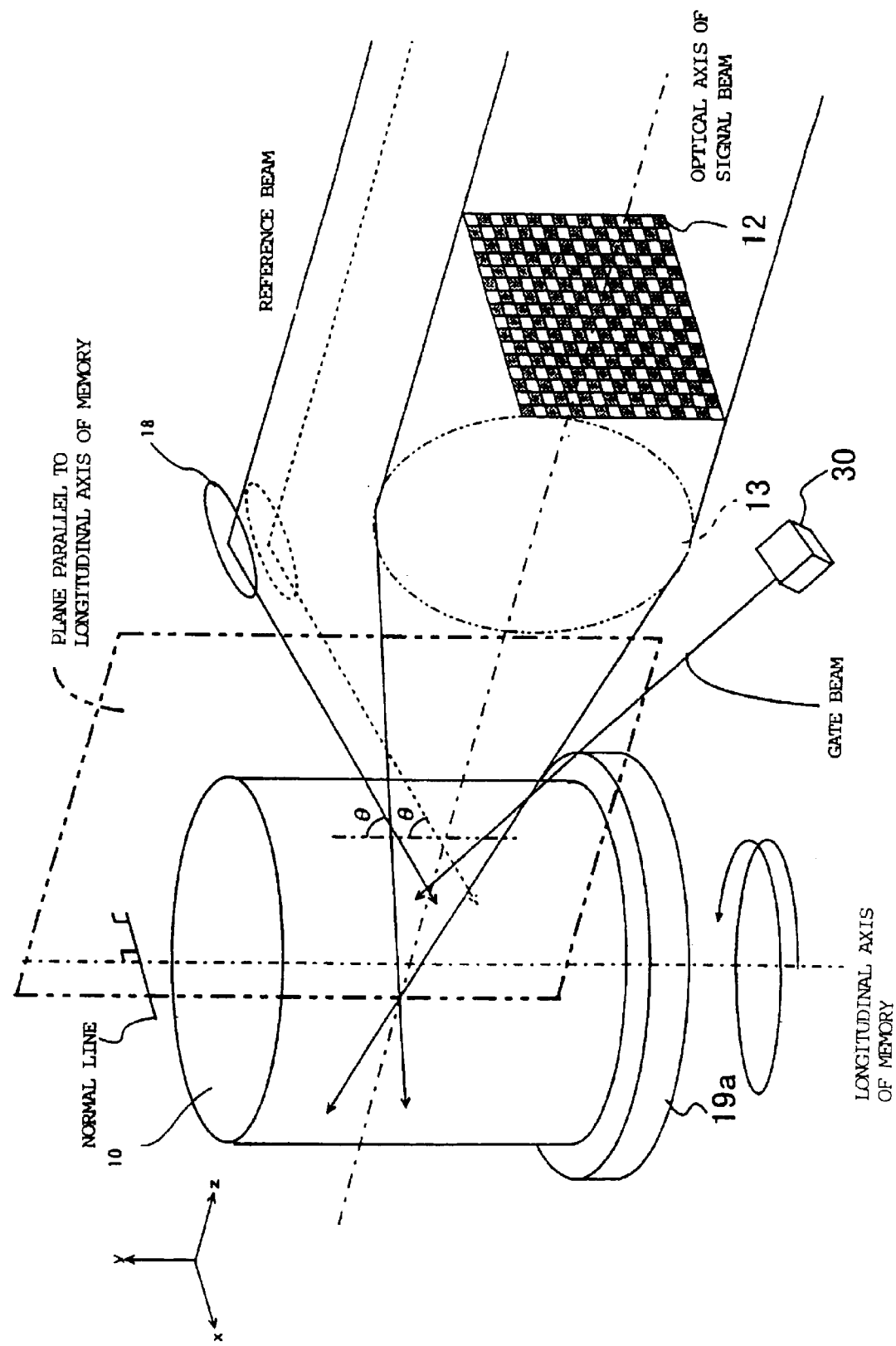
FIG. 3 is a perspective view showing an essential part of a volume holographic memory system according to the present invention.

The superluminescent diode 30, as a gate beam means, is arranged so as to restrict irradiation of the gate beam to a region where the reference beam and the signal beam intersect each other in the volume holographic memory 10, and is controlled between on and off operation by a controller 20. The gate beam is disposed in a plane including a normal line perpendicular to the symmetrical axis of rotation of the volume holographic memory as shown in FIG. 3. More specifically, the reference beam and the signal beam as well as the gate beam also intersect one another in a plane including the symmetrical axis of rotation of the cylindrical volume holographic memory or in a plane parallel to the plane including the rotational symmetry axis as shown in FIG. 4.

In this manner, when data is to be recorded, the reference beam, the signal beam and the gate beam simultaneously irradiate a predetermined part in the volume holographic memory 10 to record an interference pattern as a refractive index grid having refractive index variations. A period of time, during which a hologram is formed, is controlled by the automatic shutter provided in the laser beam source apparatus.

In the case where a Fourier plane is present in the volume holographic memory, the signal beam has a highest intensity on the Fourier plane, so that, when the reference beam interferes with a zero order beam of the signal beam on the Fourier plane, which has a high light intensity, the photorefractive effect becomes saturated to exhibit a tendency that a non-linear distortion is introduced in a recorded image. A problem of such non-linear distortion can be avoided by arranging the optical elements of the system such that the reference beam and the signal beam interfere with each other in front of or inward of the Fourier plane.

The cylindrical volume holographic memory 10 is disposed on a means, that is, a vertical and rotating movement mechanism, for moving the memory in a predetermined pitch in a direction along the axis of the optical crystal, and rotating the memory in a predetermined pitch about the symmetrical axis of rotation. The vertical and rotating movement mechanism is provided with a drive unit 19 and a vertical movement mechanism 19b, which includes a rotary table 19a and is connected to the drive unit 19. The controller 20 controls the drive unit 19 for rotation and vertical movements of the rotary table 19a.

The volume holographic memory 10 is disposed on the rotary table 19a so that the axis of the optical crystal 9 coincides with an axis of rotation of the drive unit 19. Rotation of the drive unit 19 causes the volume holographic memory 10 to move in a direction indicated by an arrow A in FIG. 2, and at the same time to rotate in a direction indicated by an arrow B in FIG. 2. The vertical movement of the volume holographic memory 10 in the direction indicated by the arrow A leads to a movement of the recorded position in the direction of the arrow A where the interference fringe formed by the reference beam and the signal beam in the volume holographic memory 10, so that the spatial multiplexed recording can be performed. Further, the volume holographic memory 10 rotates along the direction of the arrow B together with the rotary table 19a, whereby the plane, on which the interference pattern is recorded, is made to rotate. Thus, the angular multiplexed recording and the spatial multiplexed recording can be performed.

It should be noted that while the movement mechanism is shown in the present embodiment to perform angular multiplexed recording and spatial multiplexed recording at the same time, one of the multiplexed recordings can be performed by the use of a movement mechanism, which performs one of the vertical movements of the volume holographic memory 10 in the direction (arrow A) along the optical axis of the volume holographic memory 10 and rotating movements of the volume holographic memory (arrow B).

Also, in place of the vertical and rotating movement mechanism, it is possible to employ a movement mechanism which can control movements of the volume holographic memory separately in the direction along the optical axis thereof and rotating movements thereof. For example, a configuration is possible, in which the volume holographic memory is rotated in the direction of rotation by an ultrasonic motor or the like, and feeding movements of the volume holographic memory in the direction along the optical axis of the volume holographic memory are controlled by a separate uniaxial moving stage.

At the time of reproduction, the volume holographic memory 10, in which recording has been performed in the above-described manner, is arranged on the rotating movement mechanism in the same manner as the time of recording, the controller 20 controls closure of the shutter 6a and performs on-off control of the superluminescent diode 30 so that only the reference beam from the mirror 18 is made incident on the volume holographic memory 10. Then, diffracted light from the interference fringe recorded in the volume holographic memory 10 is made incident as a reproduced light beam on the CCD 22 through the inverse Fourier transform lens 21 to form a reproduced image. The CCD 22 includes a two-dimensional light receiving plane having, for example, 640 pixels in a line and 480 pixels in a row, like the spatial optical modulator 12. The CCD 22 converts the received reproduced light beam into an electric signal to supply to the decoder 26. The decoder 26 compares the input electric signal with a predetermined slice level to output binary digital data.

In this manner, a so-called 2-color volume holographic memory system is achieved, in which the reference beam and the signal beam of the first wavelength are irradiated on the volume holographic memory and simultaneously a gate beam, which is of a second wavelength different from the first wavelength is irradiated. The gate beam has an effect of increasing the photosensitivity of the volume holographic memory. The interference fringe is recorded at the portion in the volume holographic memory where the reference beam, the signal beam and the gate beam are irradiated.

The 2-color volume holographic memory system can resolve a disadvantage in a conventional, so-called 1-color volume holographic memory system, in which only one laser of one wavelength is used as a light source for the reference beam and the signal beam. The disadvantage is that the recorded information present on the respective optical paths of the reference beam and the signal beam after the recording of interference fringe is erased by the reference beam and the signal beam.

The volume holographic memory of the 2-color volume holographic memory system has high recording sensitivity when an extraordinary ray is recorded. Therefore, the signal beam cannot be arranged in two planes having normal lines at ±45 degrees relative to the axis of the optical crystal, respectively, as in a conventional recording and reproducing system, which uses a cube of lithium niobate crystal and an ordinary ray.

Therefore, the volume holographic memory must have a rectangular parallelepiped form or a cylindrical form. In the case of the volume holographic memory with the rectangular parallelepiped form, if memory capacity is to be increased, spatial multiplicity should be increased by enlarging an area of the portion of a plate-shaped volume holographic memory, upon which light is incident, or multiplicity of a location due to angular multiplexing should be enhanced by increasing a thickness of the volume holographic memory plate.

However, enlarging an area of the plate-shaped volume holographic memory, upon which light is incident, leads to an increase of the apparatus size. Also, enhancement of the multiplicity of angular multiplexing, the incident angle of the reference beam cannot be changed greatly because a refractive index at wavelength of 633 nm is 2.2 and the total reflection angle is as large as 27 degrees with respect to an extraordinary ray in the case where the volume holographic memory is, for example, lithium niobate. Therefore, the multiplexed recording, which can be recorded in a single location, is greatly limited.

However, in the case of the above-mentioned cylindrical volume holographic memory, both of the angular multiplexing and the spatial multiplexing can be performed at the same time by causing a spiral rotating movement of the volume holographic memory, so that it is unnecessary in principle to scan the reference beam. Since there is a margin for multiplicity in a radial direction of the volume holographic memory, so that memory capacity can be increased by performing spatial multiplexing.

As shown in FIG. 3, when the signal beam and the reference beam are arranged in a plane having a normal line perpendicular to the symmetrical axis of rotation of the cylindrical volume holographic memory, control of an interference position can be realized only by controlling an incident position of the reference beam while the incident angle $\theta$ is fixed.

Further, when taking account of the 2-color volume holographic memory system, optimum control becomes necessary with respect to the incidence of the gate beam in order to enhance the multiplicity of spatial recording, so that the gate beam must be largely changed in incident angle and position as well as the incidence of the reference beam. In contrast, in the case of the above-mentioned cylindrical volume holographic memory, only the incident position of the gate beam should be controlled, so that a simpler system can be realized.

A comparative example of the volume holographic memory is shown in FIG. 5, wherein both of the signal beam and the reference beam are included in a plane having a normal line in parallel to the symmetrical axis of rotation of the volume holographic memory, that is, a plane perpendicular to the symmetrical axis of rotation. The system is of large size due to the necessity of large movements of the incident angle and the incident position of the reference beam when trying to control interfering portions of the signal beam and the reference beam in a radial direction of the volume holographic memory. In the case of the above-mentioned cylindrical volume holographic memory, it is needed only to control the incident positions of the entire incident beam, so that a small-sized system can be achieved.

As described above, according to the present invention, the signal beam, the reference beam and the gate beam are arranged in a plane perpendicular to the symmetrical axis of rotation of the volume holographic memory, so that it is possible to perform high density recording in a radial direction.

The nvention has been described with reference to the preferred embodiments thereof. It should be understood by those skilled in the art that a variety of alternations and modifications may be made from the embodiments described above. It is therefore contemplated that the appended claims encompass all such alternations and modifications.

What is claimed is:

1. An optical information recording and reproducing apparatus, said apparatus comprising:
   a volume holographic memory made of a photorefractive crystalline material and having a cylindrical form and a longitudinal axis, said longitudinal axis being parallel to the cylindrical surface of said cylindrical form;
   a support portion for detachably supporting said volume holographic memory;
   a reference beam supplying portion for supplying a coherent reference beam of a first wavelength incident on said volume holographic memory at a fixed incident angle relative to said longitudinal axis;
   a signal beam generating portion for supplying a coherent signal beam of the first wavelength, which is modulated in accordance with image data, said signal beam being incident on said volume holographic memory and intersecting said reference beam in the interior of said volume holographic memory to generate a three-dimensional light interference pattern of said signal beam and said reference beam;
   a detecting portion for detecting a diffracted light from a refractive index grid of the light interference pattern in said volume holographic memory, by re-irradiating said reference beam; and
   a controller for angularly positioning said volume holographic memory about said longitudinal axis to perform multiplexed recording,
   wherein optical axes of said signal beam and said reference beam are arranged in a plane which intersects said volume holographic memory and is parallel to said longitudinal axis of said volume holographic memory such that said interference pattern may be recorded in said volume holographic memory in a radial direction by controlling only an incident position of said reference beam.

2. An optical information recording and reproducing apparatus according to claim 1, further comprising a gate beam supplying portion for supplying a gate beam incident on said volume holographic memory, wherein said gate beam is of a second wavelength for increasing photosensitivity of said volume holographic memory and for one of activating or deactivating the refractive index grid depending upon the existence or non-existence of said light interference pattern.

3. An optical information recording and reproducing apparatus according to claim 2, wherein said gate beam is arranged in a plane which is parallel to said longitudinal axis of said volume holographic memory.

4. An optical information recording and reproducing apparatus according to claim 2, wherein said gate beam supplying portion includes a superluminescent diode.

5. An optical information recording and reproducing apparatus according to claim 2, wherein said gate beam supplying portion includes means for restrictedly irradiating said gate beam onto a region where said reference beam and said signal beam intersect each other.

6. An optical information recording and reproducing apparatus according to claim 1, wherein said support portion includes means for moving said volume holographic memory in a direction along the symmetrical axis of rotation.

7. An optical information recording and reproducing apparatus, said apparatus comprising:
   a volume holographic memory made of a photorefractive crystalline material and having a cylindrical form and a longitudinal axis, said longitudinal axis being parallel to the cylindrical surface of said cylindrical form;
   a support portion for detachably supporting said volume holographic memory;
   a reference beam supplying portion for supplying a coherent reference beam of a first wavelength incident on said volume holographic memory;

a signal beam generating portion for supplying a coherent signal beam of the first wavelength, which is modulated in accordance with image data, said signal beam being incident on said volume holographic memory and intersecting said reference beam in the interior of said volume holographic memory to generate a three-dimensional light interference pattern of said signal beam and said reference beam;

a detecting portion for detecting a diffracted light from a refractive index grid of the light interference pattern in said volume holographic memory, by re-irradiating said reference beam;

a controller for angularly positioning said volume holographic memory about said longitudinal axis to perform multiplexed recording, and means for fixing an incident angle of said reference beam relative to said longitudinal axis and controlling an incident position of said reference beam so as to record said interference pattern in said volume holographic memory in a radial direction, wherein optical axes of said signal beam and said reference beam are arranged in a plane which intersects said volume holographic memory and is parallel to said longitudinal axis of said volume holographic memory.

8. An optical information recording and reproducing apparatus according to claim 7, further comprising a gate beam supplying portion for supplying a gate beam incident on said volume holographic memory, wherein said gate beam is of a second wavelength for increasing photosensitivity of said volume holographic memory and for one of activating or deactivating the refractive index grid depending upon the existence or non-existence of said light interference pattern.

9. An optical information recording and reproducing apparatus according to claim 8, wherein said gate beam is arranged in a plane which is parallel to said longitudinal axis of said volume holographic memory.

10. An optical information recording and reproducing apparatus according to claim 8, wherein said gate beam supplying portion includes a superluminescent diode.

11. An optical information recording and reproducing apparatus according to claim 8, wherein said gate beam supplying portion includes means for restrictedly irradiating said gate beam onto a region where said reference beam and said signal beam intersect each other.

12. An optical information recording and reproducing apparatus according to claim 7, wherein said support portion includes means for moving said volume holographic memory in a direction along the symmetrical axis of rotation.

* * * * *